(12) United States Patent
Frith

(10) Patent No.: US 7,557,860 B2
(45) Date of Patent: Jul. 7, 2009

(54) ELASTOMERIC CAMERA MOUNTING SYSTEM

(75) Inventor: Martin A. Frith, Goleta, CA (US)

(73) Assignee: Linvatec Corporation, Largo, FL (US)

( * ) Notice: Subject to any disclaimer, the term of this patent is extended or adjusted under 35 U.S.C. 154(b) by 692 days.

(21) Appl. No.: 10/981,332

(22) Filed: Nov. 4, 2004

(65) Prior Publication Data

US 2006/0092318 A1 May 4, 2006

(51) Int. Cl.
*H04N 5/225* (2006.01)
(52) U.S. Cl. ........................................ 348/374; 348/373
(58) Field of Classification Search ................. 348/374, 348/340, 208.7, 375, 373, 65–75; 396/535, 396/529, 533; 361/679–686; 438/117
See application file for complete search history.

(56) References Cited

U.S. PATENT DOCUMENTS

| 4,933,752 | A | * | 6/1990 | De Rooij | 348/336 |
| 6,793,416 | B2 | * | 9/2004 | Peterson et al. | 396/427 |
| 6,956,610 | B1 | * | 10/2005 | Walls | 348/340 |
| 2005/0074548 | A1 | * | 4/2005 | Puterbaugh et al. | 427/104 |
| 2005/0168934 | A1 | * | 8/2005 | Wendel et al. | 361/685 |

* cited by examiner

*Primary Examiner*—David L Ometz
*Assistant Examiner*—Antoinette T Spinks
(74) *Attorney, Agent, or Firm*—Gene Warzecha

(57) ABSTRACT

A shock mounting system for a 3-chip video camera. The system comprises a prism mounting bracket with a pair of laterally spaced support legs. A standard 3 chip color camera is received between the support legs and a plurality of elastomeric plugs are molded to fit between the camera assembly and the housing within which it is situated. The elastomeric plugs are formed from flowable elastomeric material injected into molding chambers formed during the assembly process.

4 Claims, 12 Drawing Sheets

ELASTOMERIC CAMERA MOUNTING SYSTEM

BACKGROUND OF THE INVENTION

1. Field of the Invention

The invention relates to shock mounting electronic devices. In particular, the invention relates to shock mounting an imaging device used in an endoscopic video camera.

2. Description of the Prior Art

Charged coupled device (CCD) video cameras have come into extensive use in industrial and medical fields. In medical applications these cameras attach to an eyepiece of an optical instrument called an endoscope so that one or more physicians observe on a television monitor what one formerly viewed directly by eye at the endoscope eyepiece. With a diameter of generally less than 10 mm, endoscopes are passed into body cavities through small holes to observe structures and perform procedures previously requiring large surgical openings. Two of the most common types of CCD cameras that are in use in medical surgery today are the single CCD camera and the 3-CCD camera, the latter sometimes called a 3-chip camera. In the case of the 3-CCD camera, light entering the camera from a lens system is separated by a multi-part glass prism assembly, whose optical faces are coated with high and low pass dichroic coatings, such that red light wavelengths of the incoming light image are reflected to one CCD, the blue wavelengths from the image are reflected to a second CCD, and the green wavelengths pass through to a third CCD. The three primary color images from the three CCD's are then recombined to form one color image. The recombined color image has greater line resolution than a comparable single CCD medical camera, and superior color reproduction. The high resolution, superior color video image produced by the 3-CCD camera is favored by some surgeons for use in medical procedures. The negative side of the 3-CCD camera is that it is larger, heavier, more expensive than a single CCD camera, and the adhesively assembled glass prism and CCD assembly is relatively easily damaged by rough handling. Further, the recombination of the three primary color images must be done with extreme accuracy to obtain the improved image resolution. Any displacement or breakage of components in the assembly due to shock or thermal distortion severely reduces image resolution or eliminates it entirely, and is virtually unrepairable.

Prior U.S. patent application Ser. No. 09/252,330, filed Feb. 18, 1999 and entitled Shock Mounting System for CCD Camera, assigned to the assignee hereof and incorporated by reference herein, shows one way of shock mounting a CCD camera. The disclosure in that application involved securing support plates to the prism assembly (to join the components together) and then enclosing the support plates in an elastomeric preformed boot structure interposed between the support plates and the camera housing. It has been found that the invention disclosed herein is an improvement over the devices and methods disclosed in this prior application.

It is accordingly an object of this invention to produce a system to reinforce and mount a camera assembly to enable it to withstand inadvertent shock loads.

It is another object of this invention to produce a system and method to shock mount a 3-CCD camera assembly to enable it to withstand shock loads such as a drop from a surgical table to a hard floor that would normally destroy an unmodified 3-CCD camera.

It is a further object of this invention to produce a system for converting a 3-CCD camera from non-ruggedized form to a ruggedized form.

It is another object of this invention to produce a shock mounting system for a 3-CCD camera that is relatively easy to manufacture and repair.

SUMMARY OF THE INVENTION

These and other objects are accomplished by the preferred embodiment disclosed herein which is a shock mounting system for a 3-chip CCD camera. The system is embodied in a camera head comprising a camera assembly having at least one CCD imaging device and an inlet window for receiving an image to be presented to the CCD imaging device. The camera head comprises a housing for containing the camera assembly. A camera mount is interposed between the camera assembly and the housing, the camera mount being immovably secured to the camera assembly. Elastomeric plugs are formed from flowable elastomeric material that is interposed between the camera mount and the housing.

In another aspect the invention comprises a method of producing a shock mounted camera. The method comprises the steps of producing a camera comprising: providing a housing; providing a camera assembly to be received within the housing; providing a plurality of support members to be immovably secured to the housing, adjacent the camera assembly, while providing a predetermined gap between the camera assembly and the support members; placing the camera assembly adjacent the support members; providing access to the gap; injecting a flowable elastomeric material into the gap; and allowing the flowable elastomeric material in the gap to cure, thereby creating a resilient buffer between the camera assembly and the support members.

DESCRIPTION OF THE PREFERRED EMBODIMENT

Figure 1:
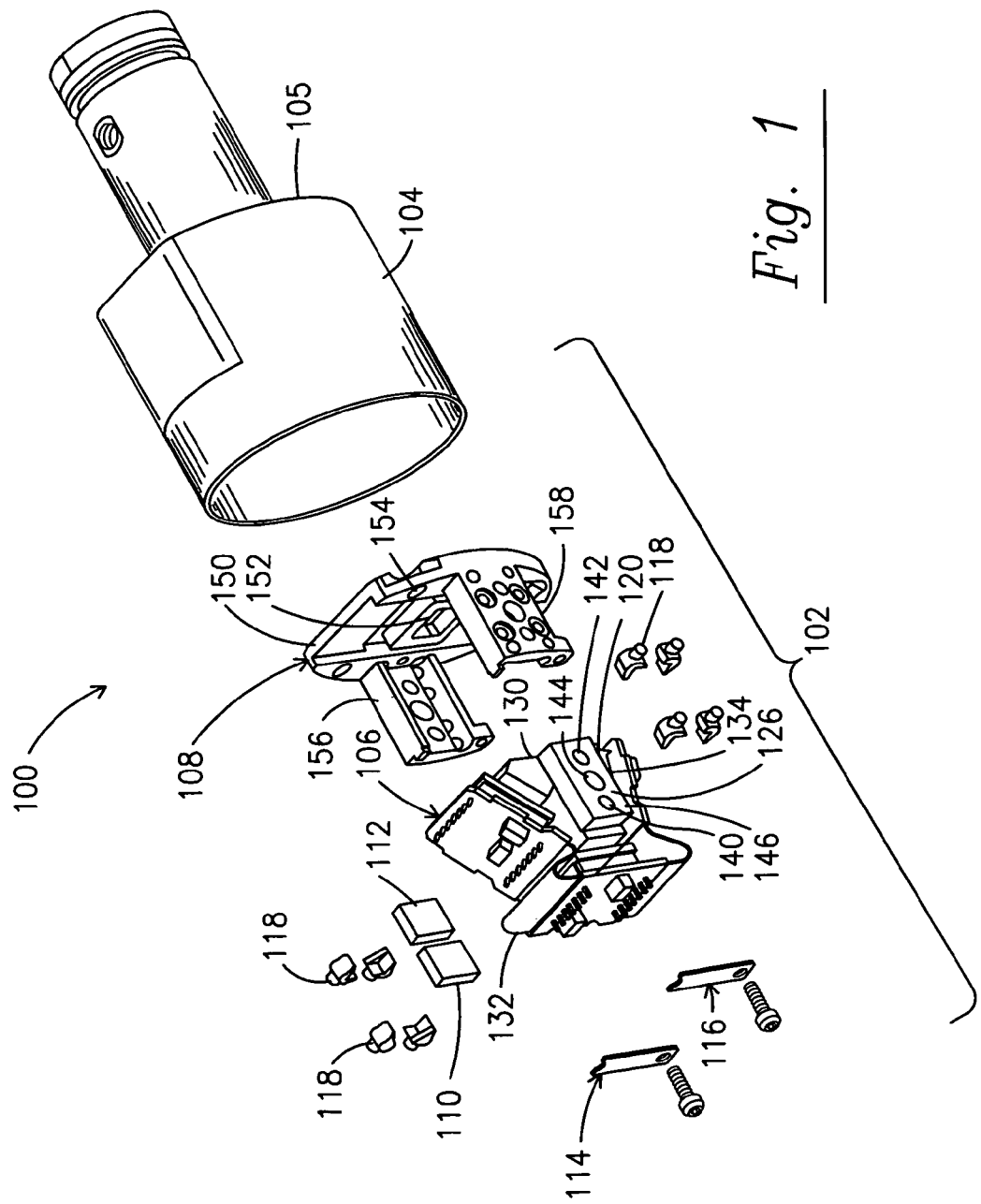
FIG. 1 is an expanded front perspective view of a 3-CCD camera head constructed in accordance with the principles of this invention.
Figure 2:
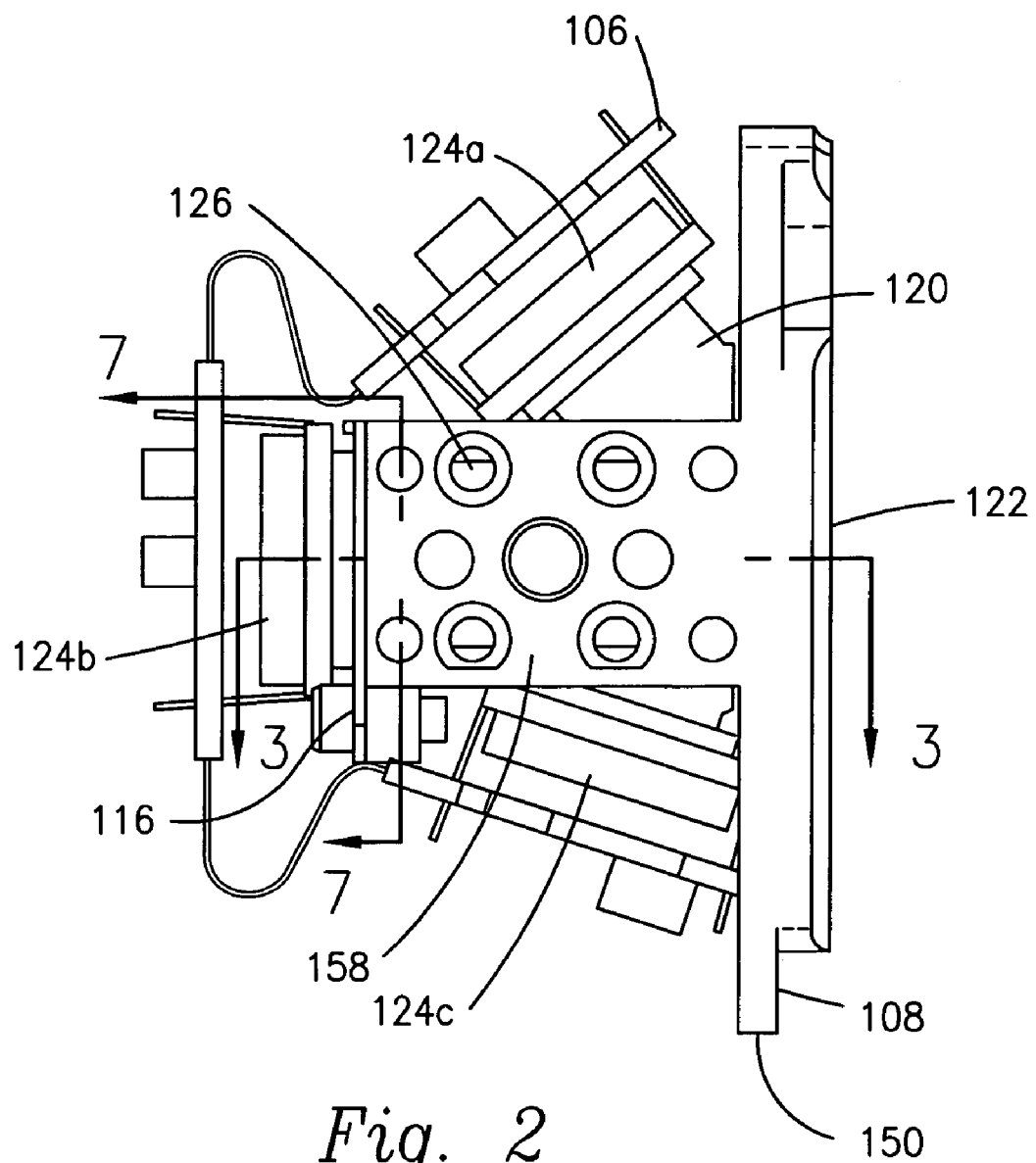
FIG. 2 is a side elevation view of a portion of FIG. 1 in an assembled configuration.

A representative 3-chip camera 100 constructed in accordance with the principles of this invention is shown in the drawings. As shown in FIG. 1, camera 100 comprises a 3-CCD/prism camera assembly 102 which fits in housing 104 and is operated by an associated electronics assembly (not shown) which operates the camera assembly in a conventional manner (the electronics assembly forms no part of this invention). The camera assembly 102 includes a CCD/prism subassembly 106 which is shown in FIG. 1 as it is received from the manufacturer thereof. Subassembly 106 is a major part of a non-ruggedized 3-chip camera produced in a conventional manner. The invention converts this existing subassembly 106 to a ruggedized version (as embodied by camera 100) capable of withstanding shocks and vibrations. When fully assembled, camera 100 will include housing 104 which will encase all of the components of 3-CCD/prism camera assembly 102 in a hermetically sealed enclosure in a conventional manner. As will be understood below, a predetermined number of individual elastomeric shock mount corner plugs 118 are interposed between the prism subassembly 106 and the housing 104 in order to minimize the transmission of any damaging shocks and vibrations between the housing and the prism subassembly.

The front or distal face 105 of housing 104 comprises a light transparent aperture (not shown) which receives a C-mount or other connection for threadably or otherwise connecting camera 100 to an optical device for forming an image, such as an associated endoscope or, in particular, a laparoscope or arthroscope (not shown). An optical coupler or similar device may be interposed between the camera and endoscope.

Camera assembly 102 comprises components designed to be interposed between CCD/prism subassembly 106 and housing 104. Such additional components are, in general, a frame or prism mount 108, mounting blocks 110 and 112, stop plates 114, 116 and elastomeric corner plugs 118. The exact nature and number of additional components needed to properly isolate prism subassembly 106 to produce the ability to adequately protect it from shocks and vibrations depends upon the structure of the prism subassembly received from its manufacturer. In the embodiment shown in the drawings, prism subassembly 106 is provided by its manufacturer in the form of a 3-CCD prism body 120 having a front inlet window 122 for receiving an image to be conveyed to CCD's 124a, 124b and 124c. Prism body 120 is also provided with a metal mounting bracket 126 bonded to the body on one side and a glass plate 128 bonded to the body on the other side (best seen in FIG. 3).

Mounting bracket 126 is provided with two non-threaded longitudinal- and lateral-position-fixing apertures 140 and 142, used for longitudinal- and lateral-positioning of the prism subassembly 106 within prism mount 108, and a threaded transverse-position-fixing aperture 144 used to secure the prism body transversely relative to prism mount 108. As will be understood below, when all three apertures 140, 142 and 144 are properly engaged, the prism subassembly 106 will be fixed in three dimensions relative to prism mount 108. In the conventional use for which prism subassembly 106 was originally designed by the manufacturer, the outer surface 146 of mounting bracket 126 would simply be abutted against a retaining surface (not shown) by a screw passing through the retaining surface and received in aperture 144. As will be understood below, the structure and method disclosed herein modifies the normal use of mounting bracket 126 to achieve the benefits of the invention.

Figure 7:
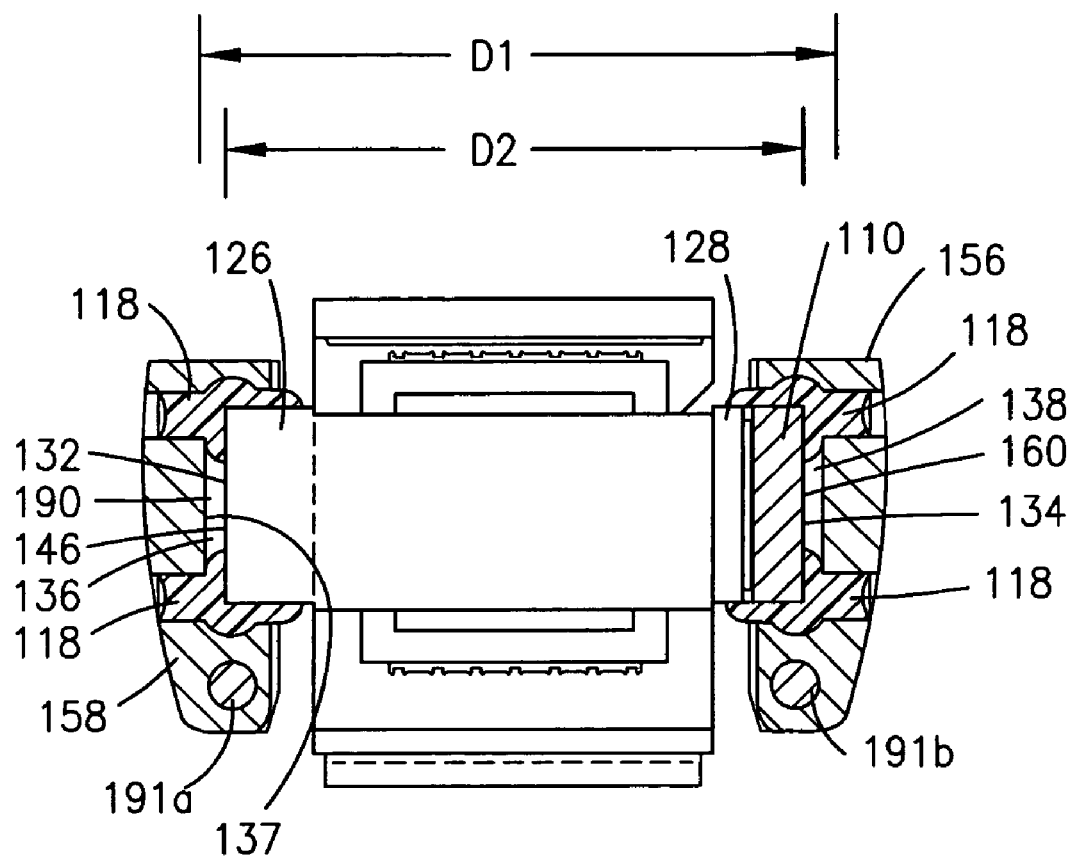
FIG. 7 is a cross-sectional view of FIG. 2 taken along the line 7-7.

Prism mount 108 serves as an intermediate structure adapted to receive prism subassembly 106 and adapted to itself be received in and secured to housing 104. Prism mount 108 has a front plate 150 with a light transmitting aperture 152 to be aligned with prism inlet window 122 and additional peripheral apertures 154 to enable it to be secured to housing 104. Integrally formed with front plate 150 and extending proximally therefrom are laterally spaced support members in the form of plates or legs 156 and 158. It will be understood that support legs 156 and 158 need not be part of front plate 150 and could be independent members separately formed and/or directly attached to or formed as part of housing 104. As best seen in FIG. 7, the support legs 156 and 158 are each spaced apart by a distance D1 greater than the width D2 of the modified prism subassembly 106. Additionally, the cross-section of each support leg 156 and 158 is generally 3-sided to partially enclose the mounting brackets attached to each side of the prism body.

Mounting blocks 110 and 112 are provided to serve as extension elements so the width of the prism body (as modified by the mounting brackets), from the laterally outermost surface 146 of mounting bracket 126 to the laterally outermost surface 160, is symmetrical about the inlet window 122 of the prism subassembly. In the preferred embodiment, mounting blocks 110 and 112 are made of made of a steel alloy known as kovar because of its thermal characteristics which allow thermal expansion/contraction (imposed on the system by sterilization processes) without destroying the integrity of the assembly. Kovar is a material which has a dimensional stability (coefficient of thermal expansion) very close to that of the glass in the prism and the CCD chips. The blocks are preferably bead-blasted to improve adhesion to the assembly and sized to be a comparable thermal mass to that of block 126. It will be understood that glass plate 128 and mounting blocks 110 and 112 could be replaced by another element like mounting bracket 126. As will be understood, the structure of the components (plate 128, blocks 110 and 112) on the side of prism subassembly 106 opposite mounting bracket 126 is just to ensure symmetry of the prism subassembly within prism mount 108. These components are, therefore, also referred to as "mounting blocks".

As shown in the drawings, after the placement of mounting blocks on both side of prism subassembly 106, the subassembly has a front side 130 and two lateral sides 132 and 134. The sides 132 and 134 are adapted to fit between support legs 156 and 158 of the prism mount 108. Mounting bracket 126 is adapted to fit within the inside 3-sided structure of support leg 158, as best seen in FIG. 7. While the preferred embodiment of the prism mount is shown as having a front plate 150 and two laterally spaced and longitudinally extending legs 156 and 158, it will be understood that the front plate could be omitted and the legs could be secured directly to the camera housing.

Figure 3:
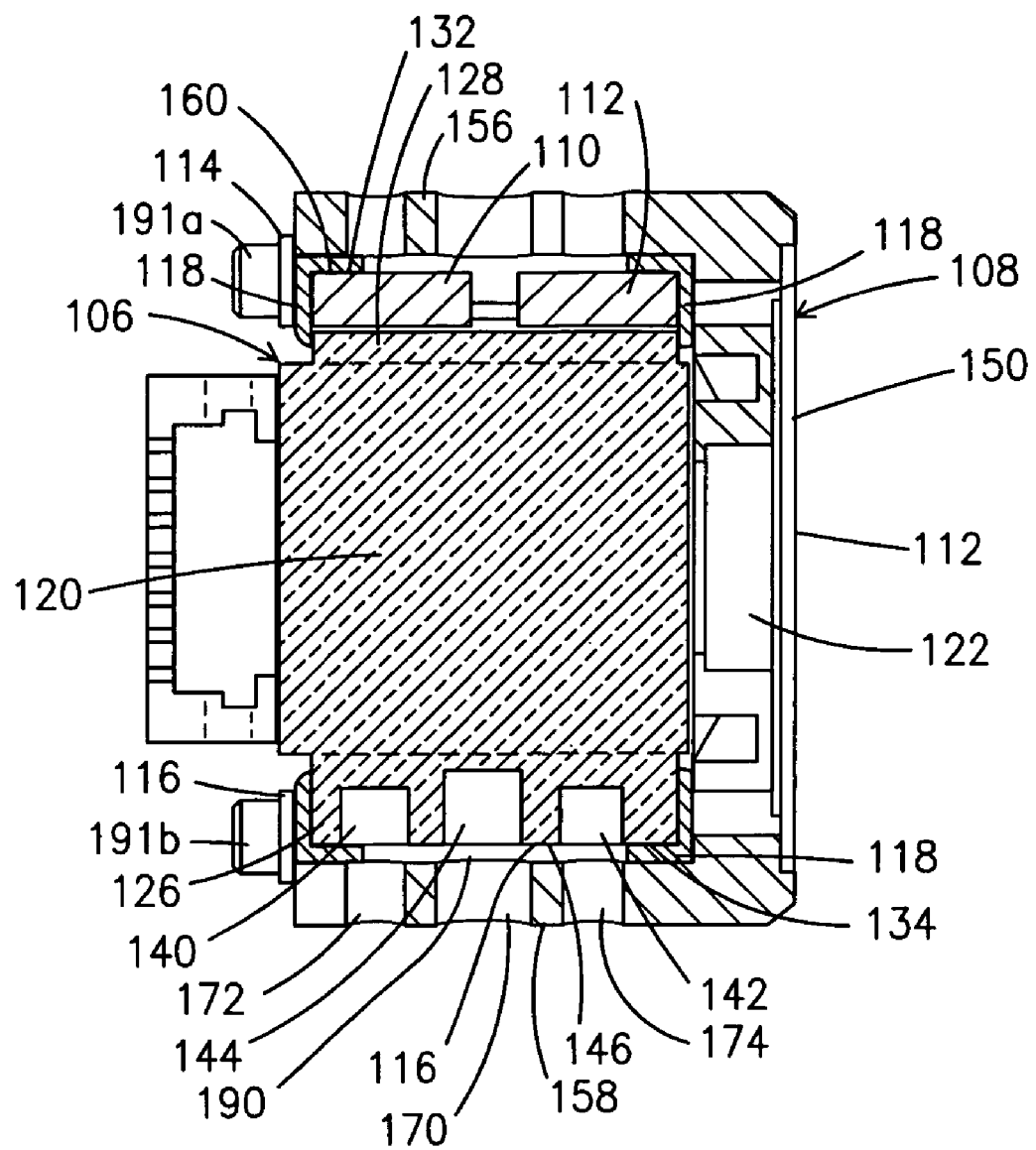
FIG. 3 is a cross-sectional view of FIG. 2 taken along the line 3-3.
Figure 4:
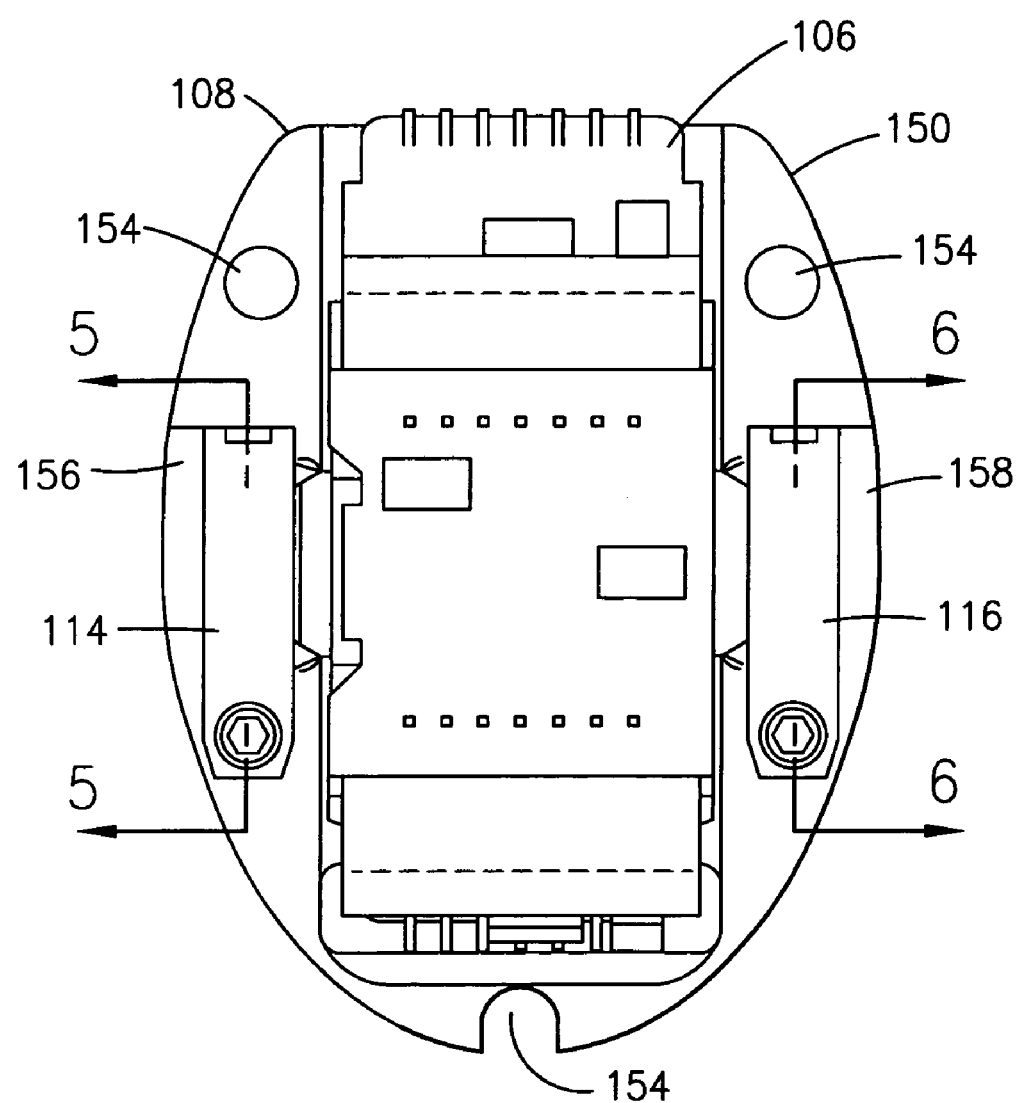
FIG. 4 is a left side view of FIG. 2.
Figure 5:
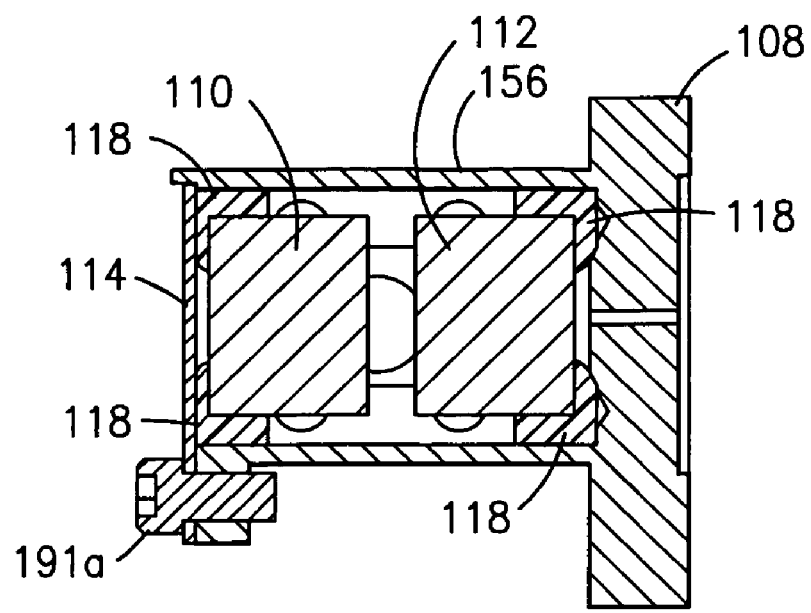
FIG. 5 is a cross-sectional view of FIG. 4 taken along the line 5-5.

If a mounting block (or blocks) on each side of the prism assembly is missing or of insufficient size, the predetermined number of mounting blocks 110 and 112 could be additionally bonded to the side of the prism as best shown in FIGS. 3 and 5 in order to assure that the mounting block assembly extends laterally a sufficient distance from the sides of the prism to adequately fill the space defined between the prism mount support legs 156 and 158 so that only small gaps 136, 138 are created (in three dimensions) adjacent each side of the prism.

Support leg 158 is provided with a plurality of apertures which are used to accurately position the modified prism subassembly 106 within the prism mount 108 and to facilitate formation of an elastomeric interface. These apertures are intended to cooperate with the apertures preformed in the mounting block 126 attached to the prism body by the manufacturer of subassembly 106.

Figure 8:
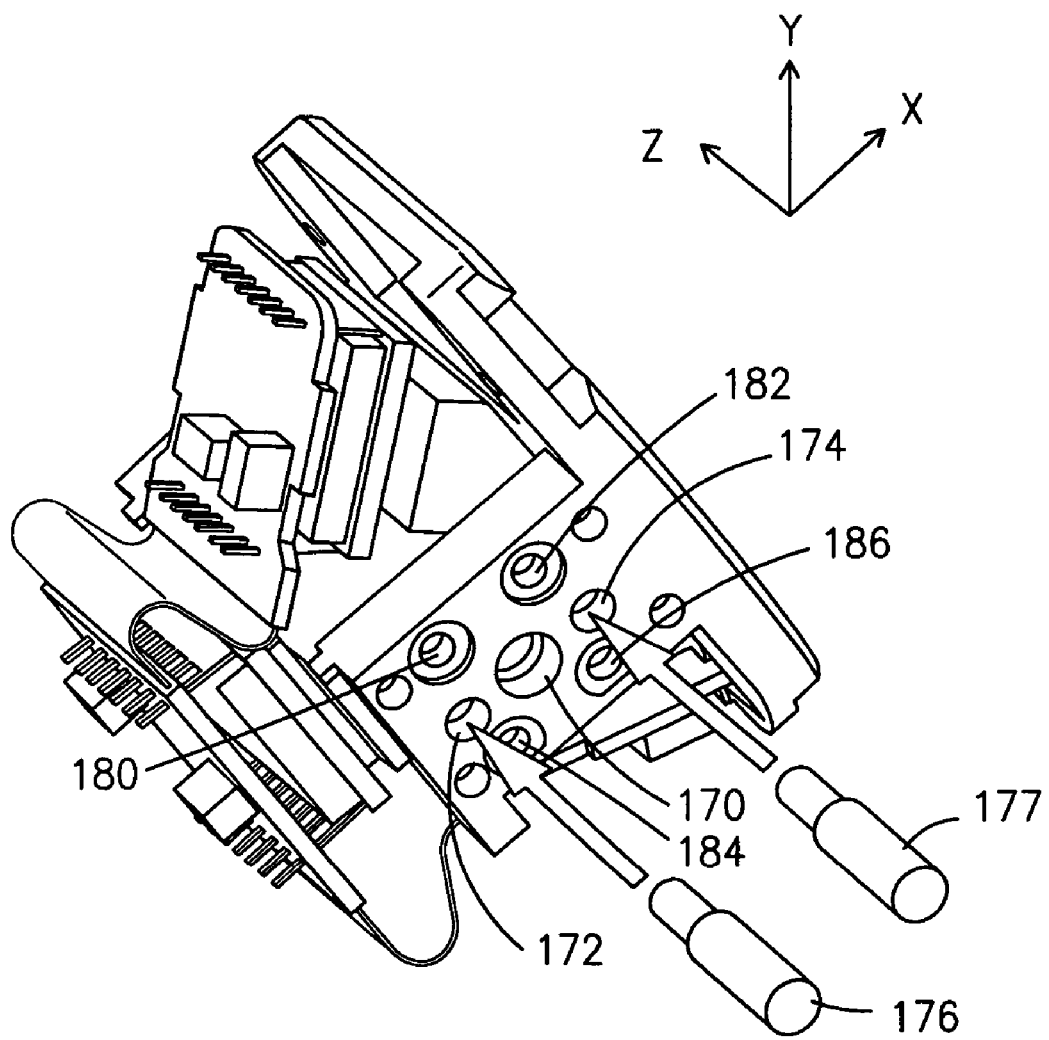
FIG. 8 is a perspective view of FIG. 2 showing a step in the method of making the invention

Referring now to FIGS. 8 through 13 the method of producing camera 102 will be described. As already mentioned, mounting block 126 has a central threaded aperture 144 and two longitudinal- and lateral-position-fixing apertures 140 and 142 on either side thereof. Support leg 158 is provided with a central non-threaded aperture 170 adapted to be aligned with threaded aperture 144, and two alignment apertures 172 and 174 adapted to be aligned with apertures 140 and 142, respectively. As shown in FIG. 8, after the modified prism subassembly is placed between support legs 156 and 158, pins 176, 177 are inserted through holes 172 and 174 in support leg 158 to position the prism subassembly 106 relative to the prism mount 108 in the X and Y directions.

Figure 9:
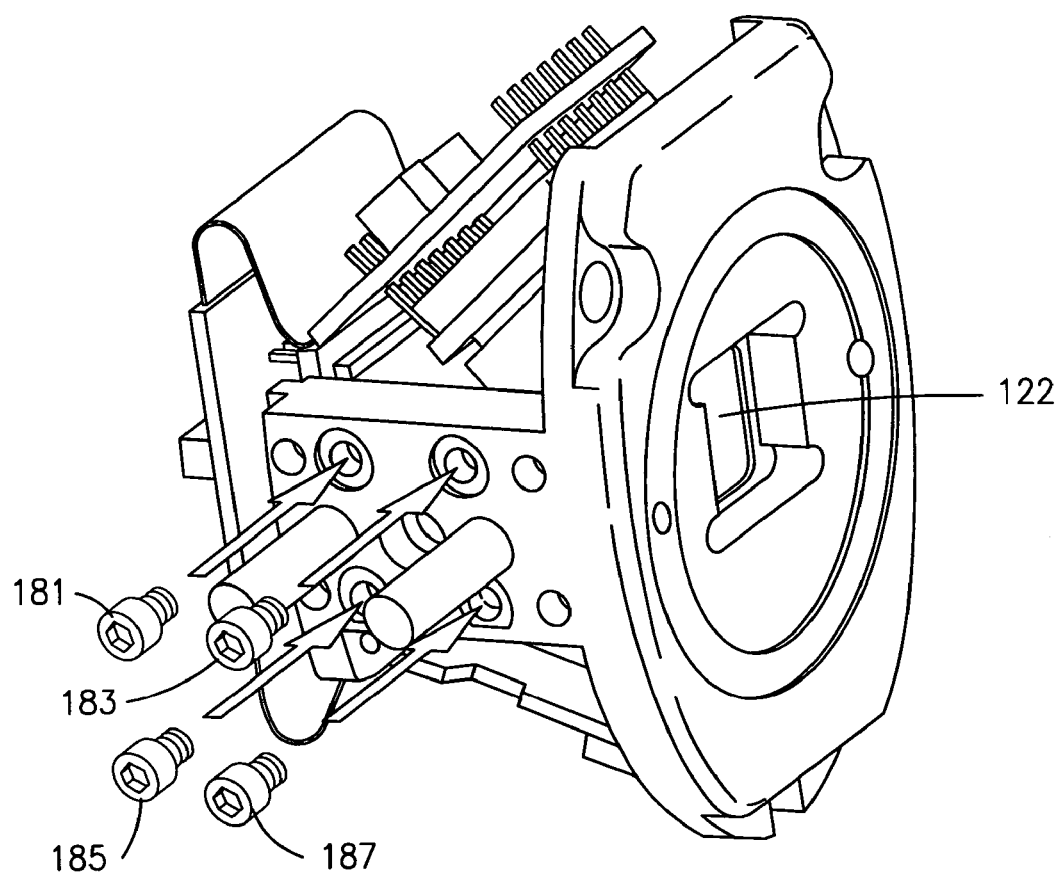
FIG. 9 is a perspective view of FIG. 8 showing another step in the method of making the invention.
Figure 10:
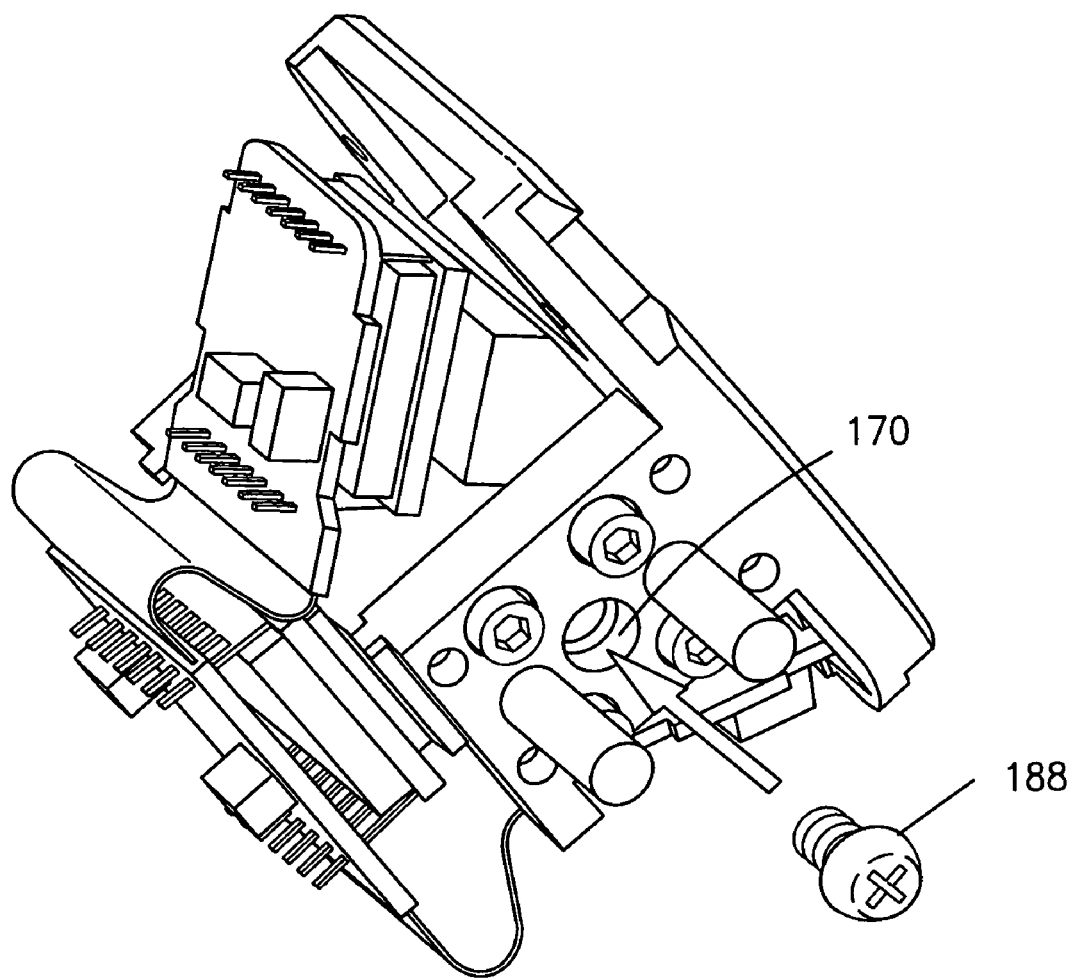
FIG. 10 is a perspective view of FIG. 9 showing another step in the method of making the invention.
Figure 11:
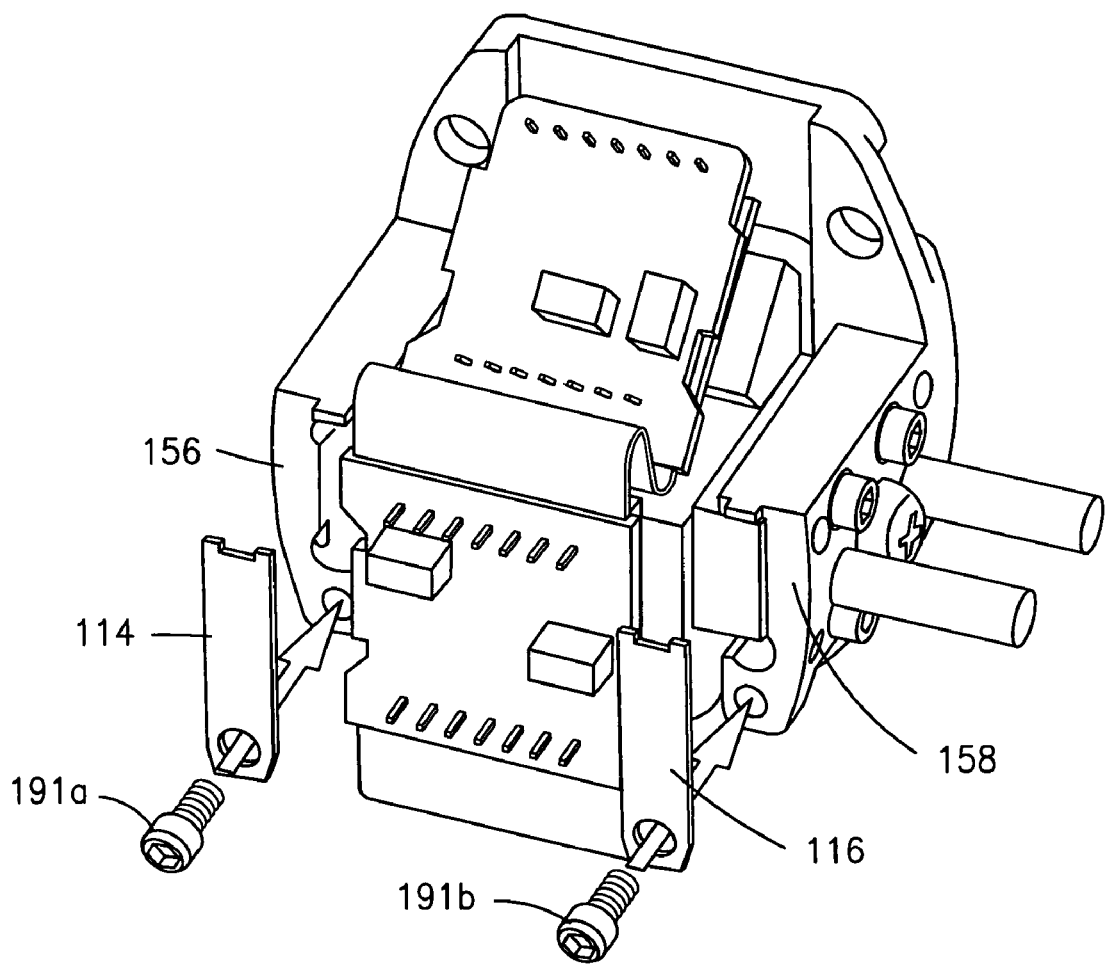
FIG. 11 is a perspective view of FIG. 10 showing another step in the method of making the invention.

Then, as shown in FIG. 9, additional screws are used to position the components in the Z direction. To do this, support leg 158 is provided with four threaded apertures 180, 182, 184 and 186 which are symmetrically situated around central aperture 170. As seen in FIG. 10, the apertures are intended to receive threaded transverse-position-setting screws 181, 183, 185 and 187. These screws each have a predetermined length and their distal ends are intended to provide transverse stop surfaces which define the gap 136 between the inside surface 137 of support leg 158 and the outside surface 132 of mounting bracket 126. It will be understood that when transverse-position-fixing screw 188 (FIG. 10) is received in aperture 170 and threaded into aperture 144 in mounting block 126, the mounting block will be pulled transversely toward support leg 158 until its outer surface 132 abuts the ends of transverse-position-setting screws 181, 183, 185 and 187, thereby forming a chamber 190. Stop plate 116, best seen in FIG. 11, is attached by screw 191b to the proximal end of support leg 158 to define the back wall of chamber 190. (Similarly, stop plate 114 is attached by screw 191a to support leg 156.)

Figure 6:
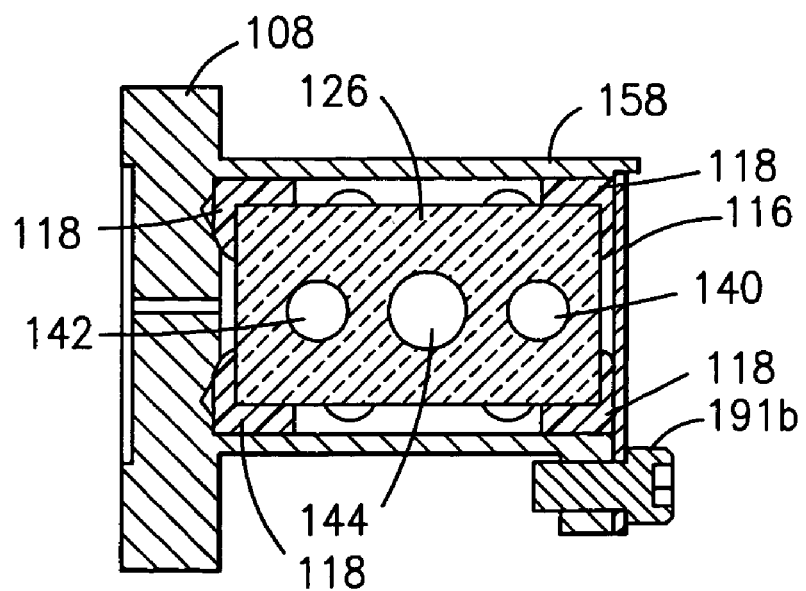
FIG. 6 is a cross-sectional view of FIG. 4 taken along the line 6-6
Figure 12:
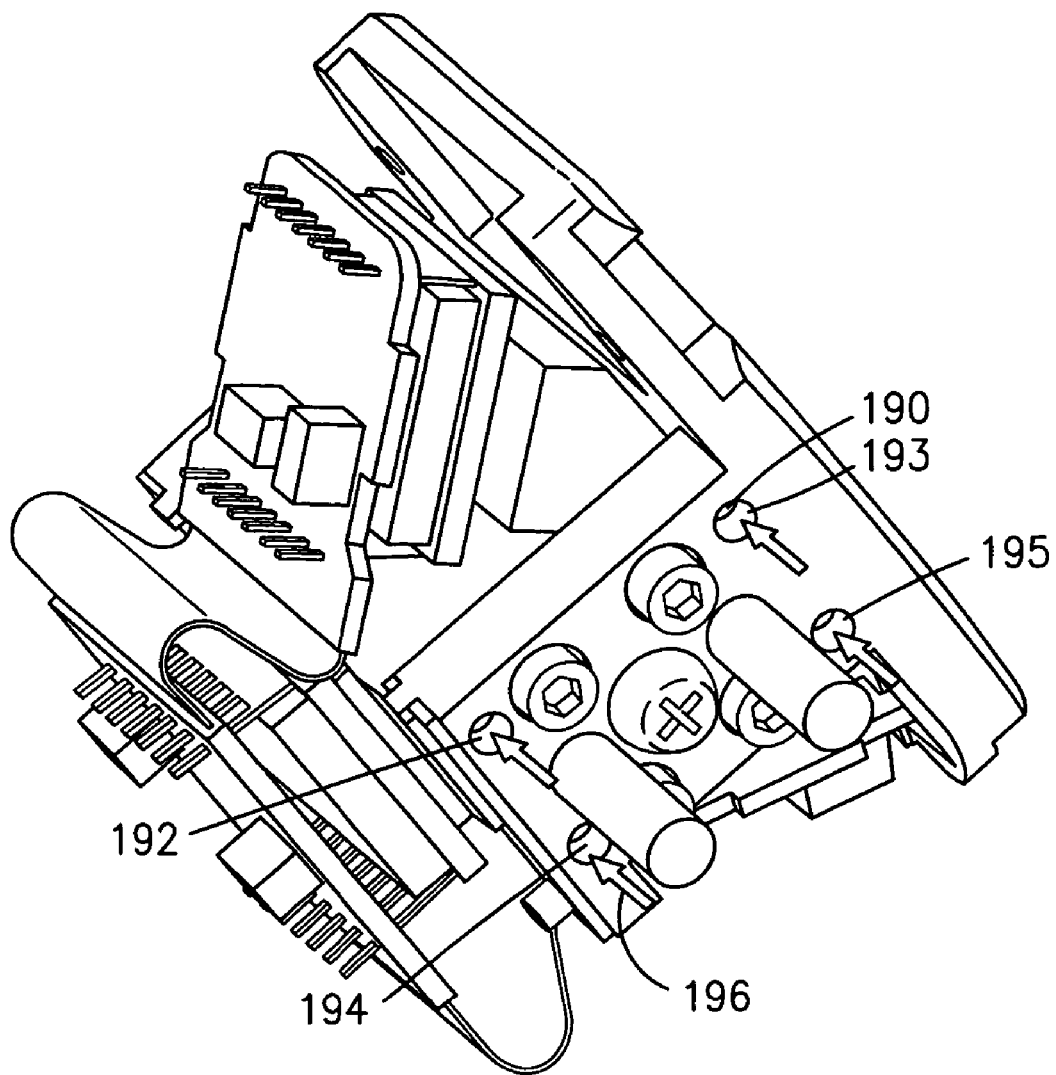
FIG. 12 is a perspective view of FIG. 11 showing another step in the method of making the invention.

Support leg 158 is also provided with injection apertures 192, 193, 194 and 195, as shown in FIG. 12 to provide access to chamber 190. Flowable elastomeric material (e.g. liquid silicone) may be injected into these apertures and into chamber 190 in the direction of arrows 196 and allowed to cure into one or more resilient plugs. (Injection apertures could alternatively be provided in other structures, e.g. front plate 150, to provide access to chamber 190.) Depending upon the quantity of injected elastomeric material, the interior of chamber 190 may be entirely or only partially filled with elastomeric material. In the preferred embodiment only a small amount of flowable elastomeric material is injected into each aperture 192, 193, 194 and 195 so that the material when cured will be in the form of four elastomeric plugs 118 situated at each corner of mounting block 126 as best seen in FIGS. 6 and 7. Each plug 118 will cure into a resilient shock absorbing corner structure having three sides, each side interposing a resilient buffer between the laterally, proximally and distally facing surfaces of each corner of mounting block 126 and the associated facing surfaces of support leg 158 (and stop plate 116). A small amount of material may remain in the injection apertures.

It will be understood that the mounting plate could be cylindrical rather than rectangular. In any event it would still have laterally, longitudinally and transversely facing surfaces and, although the elastomeric plugs would conform to such surfaces, they would be curved structures rather than corner structures.

Figure 13:
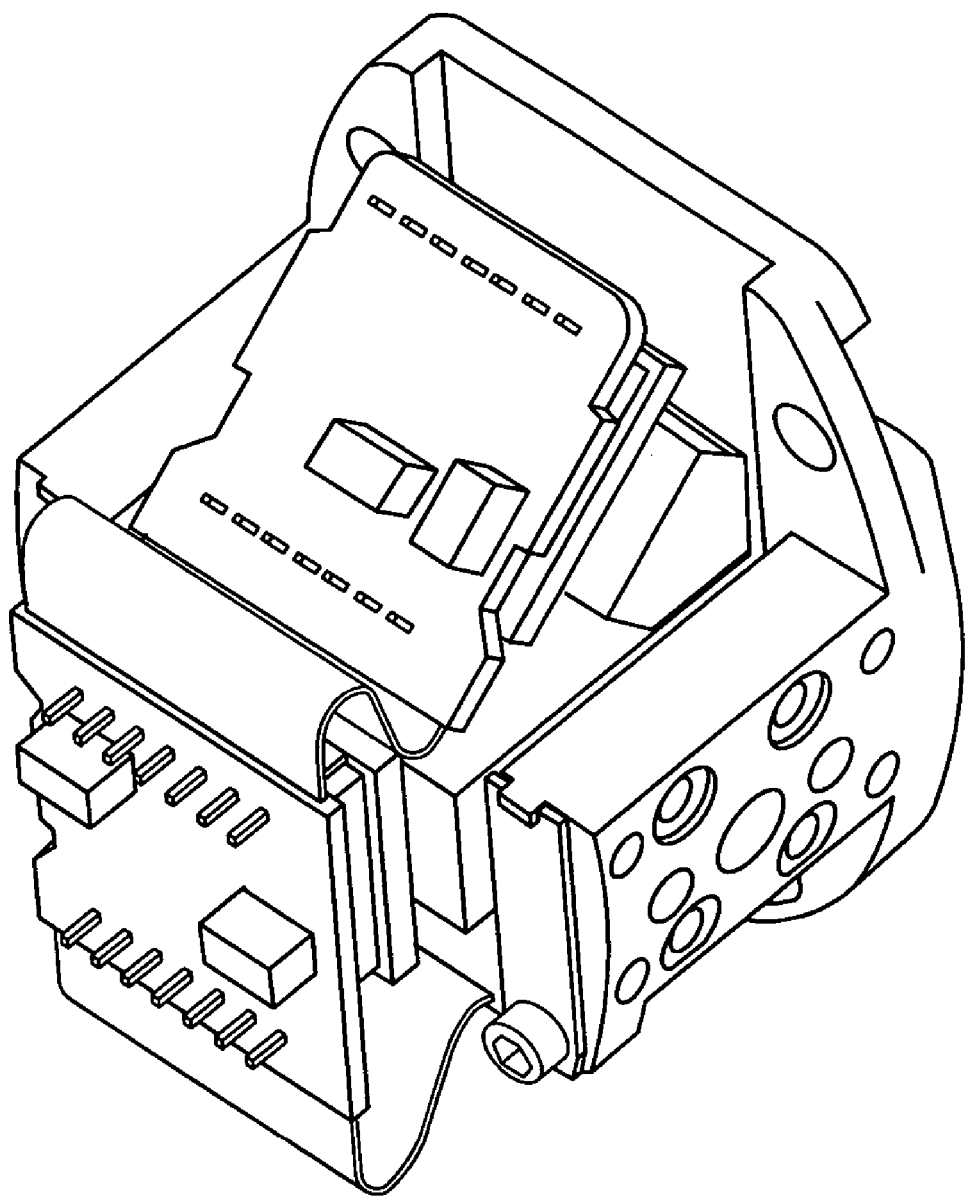
FIG. 13 is a perspective view of FIG. 12 showing another step in the method of making the invention.

The opposite side of the prism subassembly 106, modified by glass block 128 and mounting blocks 110 and 112 is similarly provided with elastomeric corner plugs 118. While support leg 156 is provided with all the same apertures as support leg 158 in order to preserve thermal stability of the camera, the longitudinal/lateral locating pins, transverse-position-fixing screws and transverse-position-setting screws need not be used in support leg 156. After elastomeric plugs 118 have been formed and sufficiently cured adjacent support legs 156 and 158, the pins 176, 177, screws 181, 183, 185, 187 and 188 may all be removed (FIG. 13). The resulting assembly may now be secured within housing 104.

It will be understood that the elastomeric plugs also provide a thermal barrier between adjacent components. Therefore, the temperatures to which housing 104 is subjected during autoclaving are not immediately experienced by the prism subassembly, thereby minimizing thermal stresses on camera 102.

While mounting brackets have been shown as being separate components attached/bonded to the sides of the prism subassembly, it will be understood that the functions of the mounting brackets may be achieved by appropriately shaping or modifying the prism itself.

While the invention has been disclosed in the form of an apparatus and method for use with a 3-CCD camera, it will be understood that the principles of this invention could be applied to other camera assemblies.

It will be understood by those skilled in the art that numerous improvements and modifications may be made to the preferred embodiment of the invention disclosed herein without departing from the spirit and scope thereof.

What is claimed is:

1. A method of producing a shock-absorbent camera comprising:
    providing a housing;
    providing a camera assembly with a mounting block to be received within said housing;
    providing a plurality of support legs to be immovably secured to said housing, adjacent said camera assembly, while providing a predetermined gap between said mounting block and said support legs;
    placing said mounting block adjacent said support legs;
    providing access to said gap;
    injecting a flowable elastomeric material into said gap; and
    allowing said flowable elastomeric material in said gap to cure, thereby creating a resilient buffer between said camera assembly and said support legs.

2. A method according to claim 1 further comprising, prior to the injecting step, the steps of:
    providing at least one of said support legs with longitudinal- and lateral-position-fixing apertures, transverse-position-fixing apertures and at least one transverse position-setting aperture; and
    providing and using pins to cooperate with said mounting block and said longitudinal- and lateral-position-fixing aperture to hold said camera assembly in two dimensions;
    providing and using a plurality of screws of predetermined length in said transverse-position-fixing apertures to cooperate with said mounting block to situate same a predetermined distance from the support leg in a third dimension;
    providing said mounting block with a threaded aperture;
    providing and using at least one screw in said transverse-position-setting aperture and in engagement with said threaded aperture to place said mounting block at said predetermined distance from said support leg.

3. A method according to claim 2 wherein said support legs are facing and spaced apart a predetermined distance.

4. A method according to claim 2 wherein said screws and pins are removed after said elastomeric material has cured.

* * * * *